3,107,801
TILTABLE LOAD-CARRYING VEHICLE
Joseph E. Blonsky, Summerville, S.C., assignor to West Virginia Pulp and Paper Company, New York, N.Y., a corporation of Delaware
Filed Dec. 1, 1960, Ser. No. 72,935
5 Claims. (Cl. 214—506)

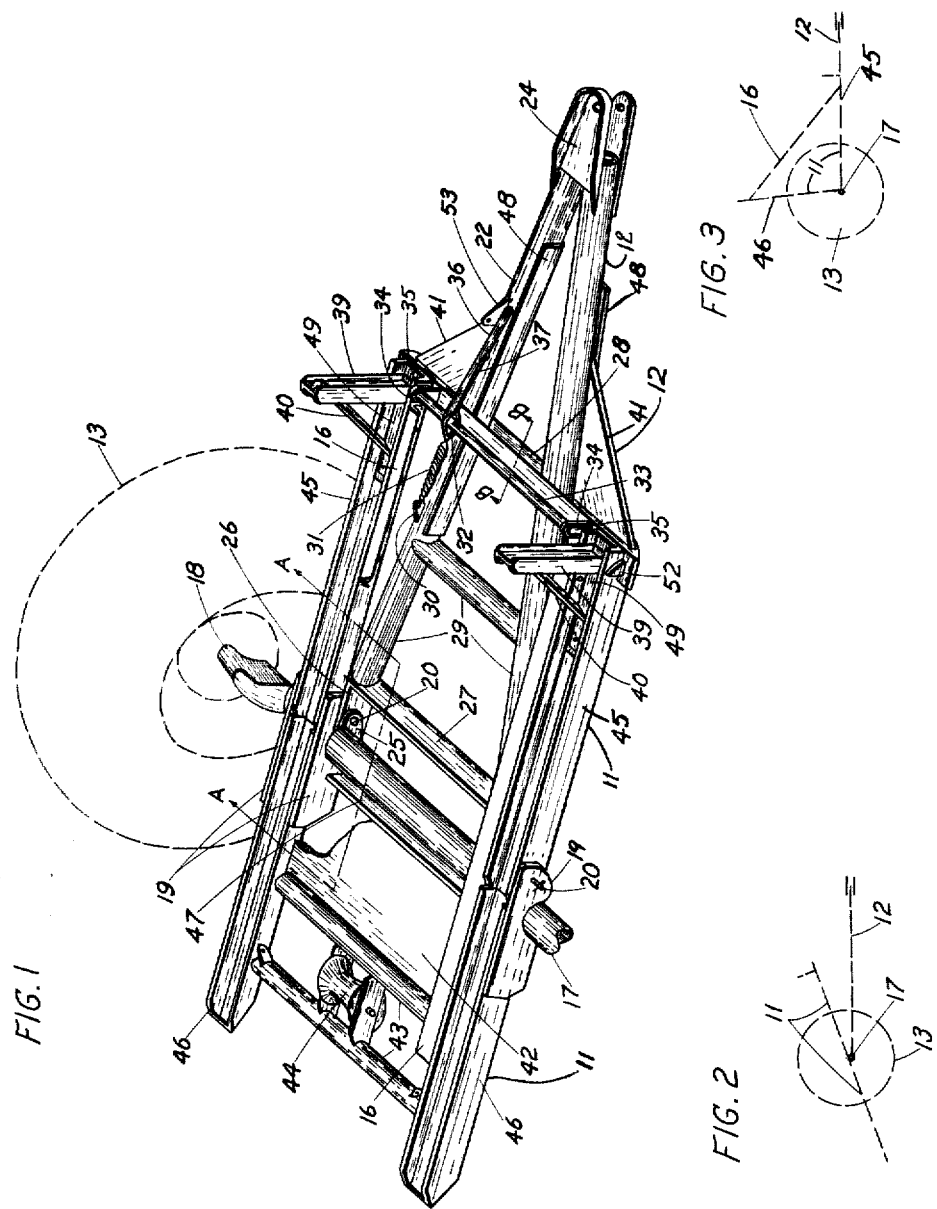

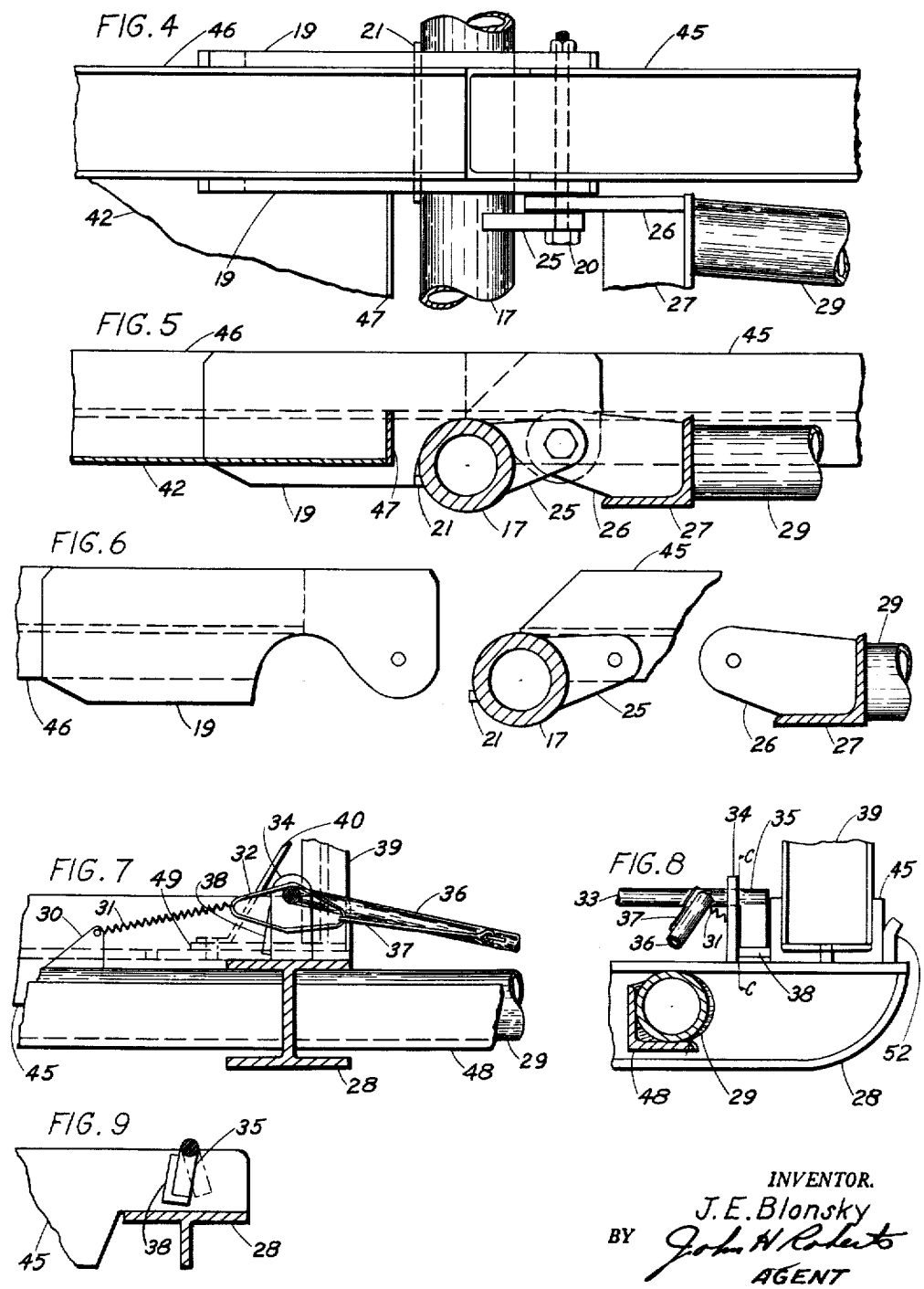

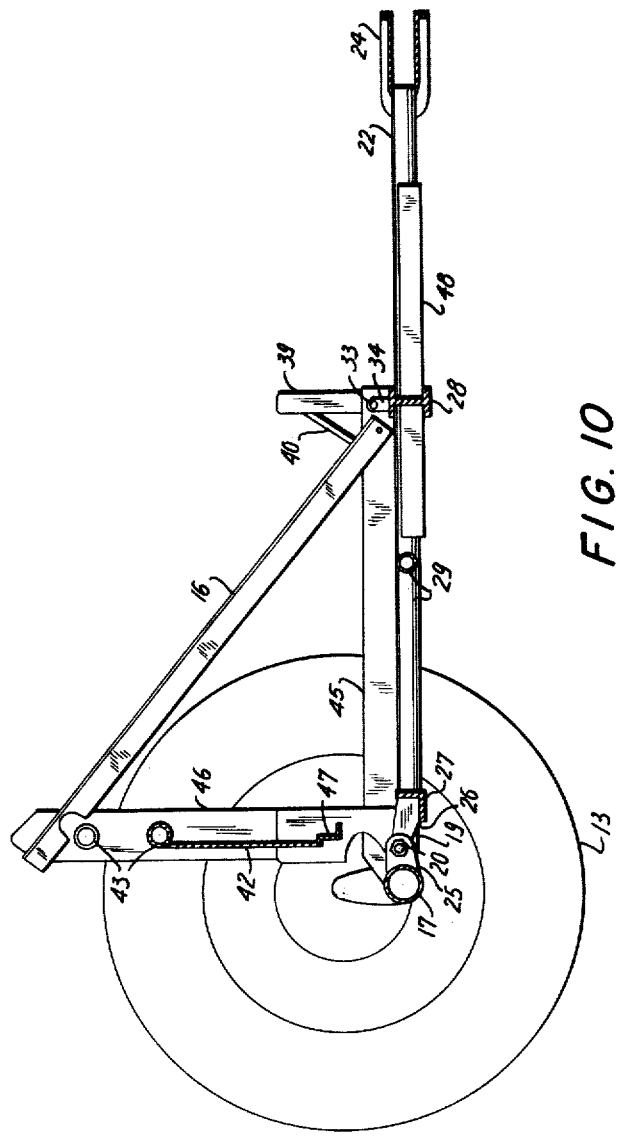

This invention relates to vehicles for transportation of bulky and heavy loads over roads and uneven terrain and more particularly to vehicles for transporting tractors, hauling pulpwood pallets, skidding logs, and similar operations connected with the procurement of pulpwood for a paper mill.

In 1958 over twenty million cords of pulpwood were cut in twelve southern states. All of this wood must be obtained from forest locations generally distant from good roads. A trailer of simple design, strong, but mobile in the woods, capable of a diversity of tasks and particularly adapted to easy loading and unloading, and also movable at highway speeds when on good roads, can be widely useful.

This invention concerns a trailer designed to work in combination with winch-equipped small crawler tractors in pulpwood operations. The trailer is designed for easier loading and unloading of pulwood pallets and of tractors through use of a tilting frame, and it is designed for skidding logs through the woods by use of a sulky arrangement. The trailer is also capable of rapid transportation of a crawler tractor over the highway.

FIGURE 1 is an isometric view of a pulpwood tilt trailer constructed in accordance with the present invention and constituting a particular working embodiment of the invention.

FIGURE 2 is an outline sketch of the tilt trailer in its tilted position, suitable for loading and unloading.

FIGURE 3 is an outline sketch of the tilt trailer in its sulky position, suitable for lifting and hauling.

FIGURE 4 is a top view of the tilt hinge and axle area on the left side of the tilt trailer, within the area indicated by A—A in FIGURE 1.

FIGURE 5 is a sectional side view of the same hinge area as FIGURE 4, looking towards the left wheel, according to A—A in FIGURE 1.

FIGURE 6 shows the components of FIGURE 5 in exploded positions.

FIGURE 7 is a sectional side view according to B—B in FIGURE 1, illustrating details of the locking arrangement on the left side of the trailer.

FIGURE 8 shows the area of FIGURE 7 as a sectional side view observed from the front of the trailer.

FIGURE 9 follows the section lines of C—C, as shown in FIGURE 8, to represent the lock from the same point of view as FIGURE 7 but from behind the shaft holder.

FIGURE 10 is a sectional view of the trailer showing the tail in the up position and ready for locking into a sulky arrangement.

In normal position of the trailer as shown in FIGURE 1, the main frame 11 is retained in a parallel position to the draw frame 12. However, as indicated in FIGURE 2 the main frame 11 can be tilted as an entity about the axle into a ground-contacting position. Further, as shown in FIGURE 3, the main frame 11, composed of a front portion 45, hereinafter termed the bed and a rear portion 46 hereinafter termed the tail, can be folded and locked by means of stabilizing bars 16 into a position where the bed 45 and the tail 46 are angularly disposed in relation to one another. By employing the trailer in the various structural configurations shown in FIGURES 1, 2, 3, and 10, the trailer is easily adaptable for alternately hauling heavy equipment such as pulpwood pallets, loading of the heavy equipment, and ground skidding of cumbersome materials such as long logs.

Referring to FIGURE 1, the frame 11 of the tilt trailer is divided into two parts, a bed 45 and a tail 46, supported by an axle 17 attached through a heavy plate boxed joint 18 to tires 13. The bed 45 of the frame 11 is welded to the axle 17, as may be seen more clearly in FIGURES 4, 5, and 6, in which flatbar hinges 19, welded to each side of the H-beams constituting the tail 46, override the axle 17 and engage the hinge pin 20. The flatbar hinges 19 also contact flat shims 21, welded to the rear area of the axle 17, while supporting, in cooperation with the hinge pin 20, the rear portion or tail 46 as a cantilever beam during the time that the rear portion or tail 46 is co-acting as a co-extensive entity with the front portion or bed 45 in both load-carrying and loading-unloading positions.

Also pivotably secured to the hinge pin 20 is the draw frame 12, comprising a drawbar assembly 22, and a drawbar hitch 24, as shown in FIGURES 1 and 4–10. To obtain shearing rather than bending forces on the hinge pins 20 through the A-frame drawbar 22 in guiding and pulling the tilt trailer, two pairs of hinge tabs are used to engage the pin 20; and axle hinge tab 25 is attached to the axle 17 slightly inboard of each flatbar hinge 19, pivotably engaging each hinge pin 20; between each flatbar hinge 19 and the proximal axle hinge tab 25, a drawbar hinge tab 26 is attached to each side of the A-frame drawbar 22 to pivotably engage the hinge pin 20. These drawbar hinge tabs 26 are welded to the ends of stiffener 27, which is itself attached across the base or widest part of the A-frame 29, with a reinforcement 48 beneath the front ends of the frame 11, as shown in FIGURES 1, 7, 8, and 10. Intersecting the A-frame and welded athwart the converging lengths of pipe and angle iron of the A-frame 29, directly beneath the front end of the frame 11, is the front-rail saddle 28.

Centered in the webs near the ends of the H-beam rails of bed 45 are upright stops 39. In one model of the invention, the stops 39 are perpendicular to the webs; in another model, a preferred construction method is used; viz, the stops 39 are welded perpendicularly to rectangular plates 49 fitting within the flanges of the rails of bed 45. The plates 49 are perforated and bolted to the webs of the rails of bed 45 at a desired distance from the axle 17. In either method of affixing the stops 39, the supporting stay bars 40 are welded to the rear webs of the stops 39, at about a 45° angle, and to the rails of bed 45 or to the plates 49. In either method of construction, stops 39 are aligned athwart the longitudinal axes of the rails of bed 45, with their webs facing fore-and-aft, and the stay bars 40 are of such a length as to be tangent to but not forcibly contacting the curved tubular members of a pallet frame when loaded upon the trailer; the channels formed by the webs and flanges of the rails of bed 45 and the stops 39 serve as guides and nesting slots for the tubular members. The preferred construction method, using the movable assemblies of stops 39, stay bars 40, and plates 49, permits shifting of a load according to variances in pallet loading, pallet construction, or prospective terrain.

Attached to the top of the front-rail saddle 28 and at the very ends of this saddle are anti-sway guide tabs 52 which serve to cradle the bed 45 within their opposing, outwardly-curved faces by contacting the outward surfaces, near the ends of the H-beam rails of bed 45, thereby resisting turning, swaying, and twisting forces exerted on the tail 46 or on the palletized load by passing brush in thickly-wooded areas or by the effects of gravity in hilly areas. These guide tabs 52 ensure that the entire trailer is a structural unit and shield the hinge components from a twisting load.

The lower flanges of the H-beams comprising the bed 45 are cut away at the front ends to permit seating of their webs over the front rail saddle 28, as shown in FIGURE 9. To strengthen the draw frame 12, gussets 41 are attached forward of the front rail saddle 28, connecting this saddle with the A-frame drawbar 29. These gussets 41 also serve to deflect passing brush and limbs.

To withstand battering blows from the ends of log lengths during ground skidding operations, when the tail 46 of the frame 11 is raised into the sulky position as illustrated diagrammatically in FIGURE 3, a rectangular steel skid and battering plate 42 is affixed on each side edge to the flatbar hinges 19 and to the H-beams of tail 46, on the forward edge to a stiffener 47 which is athwart the tail 46, parallel and near to the axle 13, and along the rear edge to the forward member of two parallel pipe supporters 43 athwart the rear part of the tail 45. Between these pipe reinforcements 43 and between the rails of the tail 46, a rotatable cast-iron roller 44 is mounted for the lifting and towing of log lengths by cable choker lines extended from and actuated by the tractor winch. Use of this roller 44 to support the cable choker lines enables a load to be lifted to any desired degree when it is being towed.

Referring to FIGURE 10, the tail 46 is raised into a substantially vertical position by pivoting about the hinge pins 20 so that the curved surfaces of the flatbar hinges 19 which confront the rear surface of the axle 17 are initially moved substantially tangentially to the adjacent axle surface and then lifted above and forward of the axle 17. The weight of the tail 46 thereby rests upon the hinge pins 20. The upright tail 46 is braced, as depicted also in FIGURE 3, by the raised stabilizing bars 16 which are notched along their lower surfaces and near their rear ends to conformably engage either of the pipe reinforcements 43, thereby restraining the tail 46 from further pivoting in either direction.

The frame 11 is suspended beneath the hubs of the wheels 13 by the boxed joints 18. The center of gravity of a loaded pulpwood pallet is usually directly above the axle 17. When the trailer moves on a fairly steep grade, this lowered axle increases the stability of the tilt trailer. The frame 11 does not actually pivot about the axle, however, in consequence of this lowered axle arrangement. More exactly, the frame and axle revolve about an imaginary axle passing through the wheel hubs. Another benefit from the lowered axle 17 is to decrease the angle of tilt of the frame 11 when in contact with the ground. Experimentally, it was found that the angle between the ground and the frame 11 which is obtained with the lowered axle 17 was sufficient to cause a loaded pulpwood pallet to slide smoothly down the steel rails 45 and 46 without tipping over upon striking the ground and that a greater angle would create an excessive speed of descent and consequent tipping.

Tilting of the elongated frame 11 into contact with the ground at the desired angle, as illustrated diagrammatically in FIGURE 2, facilitates winching up loaded pallets, releasing these loads, and loading the self-powered tractor for transporting. Pulpwood pallets are equipped with a loop at each end. The tractor winch line is hooked into either loop and, powered by the tractor winch, draws the pallet onto the tail 46 and up the inclined frame 11 until the tubular members contact the stay bars 40 and stops 39 which, in the preferred model, may be changed as to fore-and-aft position to obtain the optimum loading for the pallet whereby the frame 11 returns readily to its horizontal position to be engaged by the locking wedges 35. Pulpwood pallets may be unloaded, after removing the tractor winch line and releasing the locking means, by manually tilting the nearly balanced frame 11, whereupon the pallet readily slides down the rails of bed 45 and tail 46 constituting frame 11.

Since pallet work requires free use of the tractor winch line for loading and unloading, it is essential that no cross members exist between the forward sections of the rails comprising the bed 45. To achieve this design goal, it is necessary to use a single compact lock that can secure the frame 11 in its normal load-carrying position, approximately parallel to the A-frame 29 and to the terrain, while being attached to the drawbar assembly 22. It is also desirable to equip the locking means with a loading device or biasing means to retain it in either of the two working positions so that assistance is not needed in holding the lock either open or closed. This is accomplished with the spring 31, biasing ring 32, tension rod 37, and locking handle 36, shown in FIGURE 1. To prevent accidental opening of the locking means by undeflected brush or limbs striking the handle 36 and overcoming the biasing load exerted by the spring 31, the handle 36 may be firmly secured by passing wire, a bolt, or any other readily available and suitable object through the hole in the holding tab 53 and over the handle 36. Furthermore, the principles of the spring-loaded, 2-position lock assembly can be used for other equipment, whenever it is desired to bias a lock in either an open or a closed position as desired.

As shown in FIGURES 1, 7, 8, and 9, the locking means is secured to the top of the upper flange of this front-rail saddle 28. The locking means, a spring-loaded, 2-position lock assembly, comprises a holding tab 30 welded to the top of the 3-inch pipe comprising the left member of the A-frame drawbar 29, a locking spring 31 movably attached to said holding tab 30, a diamond-shaped biasing ring 32 attached to the other end of the spring 31, a round, elongated positioning rod 33 which is loosely encompassed by and in contact with said biasing ring 32 and rotatably secured athwart the A-frame in a position slightly above and parallel to the top of the front-rail saddle 28 by shaft holders 34 which are welded to the top of the front rail saddle 28 near each end of the positioning rod 33, rectangular locking wedges 35 which are rigidly fastened to each end surface of the positioning rod 33 at an alignment to said rod of 90°, a rigid locking handle 36 of convenient length for manual manipulation which is rigidly and perpendicularly fastened to the round surface of the positioning rod 33 at a position along this rod as to be adjacent to the diamond-shaped biasing ring 32 as it encompasses the rod, a tension-bearing elongated rod 37 movably attached to said biasing ring 32 at the side opposite to the attaching position of the spring 31 and movably attached to the locking handle 36 at a point near the unattached end of said handle, and, finally, the L-shaped lock tab and gusset 38 which is welded to each of the inward sides of the bed 45, in position to be engaged by the locking wedges 35 on each end of the positioning rod 33, firmly wedging the front ends of the frame 11 tightly against the front rail saddle 28 when the locking handle 36 is depressed.

This tilt trailer is a simple and rugged device that can be built of readily available materials without requiring elaborate and expensive machine tools. More importantly, it can be readily repaired in remote locations. The tilt trailer can be disassembled in the woods, simply by removal of the two hinge pins 20, which are also secured by cotter pins, into three sections comprising the following principal components: (a) the tail 46; (b) the bed 45, axle 17, and wheels 13; and (c) draw frame 12. Another advantage of the invention is its simplicity; manually changing the tilt of the frame 11, elevation of the tail 46 and locking it into the sulky position, and locking and unlocking of the frame 11 in its horizontal position are all handled manually and simply.

This tilt trailer has been designed to work in combination with winch-equipped small crawler tractors which are powerful and versatile in the woods but relatively slow for highway movement. Aboard the tilt trailer, however, the crawler tractor can be transported at highway speeds when suitably towed. If a panel or pickup truck is used, a very useful combination is provided, for a panel or pickup truck can tow the tractor-loaded tilt trailer and simultaneously provide economical transportation for the men and the tools. Beginning a normal cycle of operations at the roadside, the tractor is unloaded from the trailer and hitched to it. Typically, there are empty pallets at the roadside site, and operations begin by ground skidding the pallets, chained together, to a remote logging deck. Converted to a sulky at this point, the tractor-trailer combination is used for skidding to this deck of log lengths cut from the fallen trees. With logs later cut to the length used for pulpwood (60 inches) and loaded into the pallets, the sulky is again converted to a tilt trailer. Using the tilting frame for loading and the tractor winch for pulling the heavy pallets onto the load-bearing longitudinal tracks embodied in the frame 11, the four filled pallets are individually retrieved, moved to the roadside site, and individually unloaded. At this site, highway-operating tractor-trailers drop off empty pallets, for pickup and ground skidding into the woods by the crawler tractor-tilt trailer combination, and load the full pallets for delivery to the woodyard.

The tilt trailer embodied in this invention is capable of use in other fields, such as farming or the retrieval of damaged military vehicles for emergency battlefield repair. A pickaback or carrying trunk embodying the principles of the tilt trailer, as the load-carrying component of the truck body, might also be employed for these uses, enabling the towing of disabled tanks or other vehicles in addition to pickaback carrying, or, in farm work, the towing of logs, stumps, hay balers, combines, cattle trailers, ditching scoops, and wagons, for instance, in addition to carrying farm loads. For some of these uses, the tail might alternatively be lockable into other positions than has been found most satisfactory for pulpwood retrieval; for instance, a 135° angle of bed to tail would permit lifting or towing without contact of the lifted or towed object with the tail. It is also possible to adapt this tilt trailer to the transportation of boats overland and the launching or retrieval of boats from the water. Another field of use is in heavy construction activities, such as highway or dam construction and bridge building.

I claim:

1. A pulpwood pallet tilt trailer comprising load-bearing longitudinal rails separated into front and rear portions, a transverse axle supporting the rails and rigidly attached to the rear ends of said front portion, a pair of ground-engaging wheels rotatably attached to said axle, pulling means pivotably attached to the axle, said pulling means comprising an A-frame drawbar and drawbar hitch, locking means attached to said drawbar for releasably engaging and securing said front portion of the rails in load-transporting position approximately parallel with said drawbar and with the terrain, a rotatable roller rigidly mounted between the rails of said rear portion, and hinge means pivotably attaching said rear portion to the axle, the front portion, and the A-frame drawbar, said hinge means supporting as a cantilever beam the rear portion of the load-bearing longitudinal rails when said rear portion is co-extensive and co-acting with the front portion of said rails in a load-transporting position or in a loading-unloading position, said hinge means also serving as a pivot for said rear portion to be swung upward and locked by pivotable stabilizing bars in a position approximately perpendicular to the front portion of the rails, adapting the tilt trailer for use as a sulky, whereby said rotatable roller mounted between the rear rails permits the use of choker lines for the lifting and hauling of logs, said stabilizing bars normally resting parallel and adjacent to the respective longitudinal rails in the load-transporting position and in the tilted loading-unloading position of the tilt trailer.

2. A tilt trailer substantially as described in claim 1 wherein the locking means comprises a locking spring attached at one end to the A-frame, a biasing ring attached to said spring, a round, elongated positioning rod loosely encompassed by said biasing ring and rotatably secured near each end to the front-rail saddle in a position athwart the A-frame and slightly above and parallel to the top of said saddle, locking wedges rigidly fastened perpendicularly to each end surface of said positioning rod, a rigid locking handle of convenient length rigidly fastened perpendicularly to the round surface of the positioning rod at a position along said rod as to be adjacent to said biasing ring as the ring encompasses the rod, a tension-bearing elongated rod movably attached to the biasing ring at the side opposite to the attaching position of the locking spring and movably attached to said locking handle at a point near the unattached end of said handle, and an L-shaped lock tab and gusset rigidly attached to each side of the trailer bed and in position to be engaged and held down by the locking wedges when the locking handle is in the lock position but unengageable by the locking wedges when the locking handle is not in the locking position.

3. The trailer of claim 1 wherein said transverse axle is recessed below and parallel to the axis of rotation of the wheels and capable of revolving about said axis and said hinge means comprises axle hinge tabs rigidly attached to said transverse axle, flat shims rigidly attached to the axle in positions approximately 180° removed from said axle hinge tabs, flatbar hinges rigidly attached and parallel to the sides of the rails of the rear portion, overriding and comformably encompassing the top half of the axle, and contacting the flat shims, and hinge pins pivotably connecting the axle hinge tabs, the rails of the front portion, and the flatbar hinges, whereby when the trailer is tilted, the axle is revolved about the axis of the wheels through an arc equalling the angle of tilt of the frame of the tilt trailer and, when in a load-transporting position, the rear portion of the trailer is supported by the hinge means as a cantilever beam.

4. A vehicle comprising, in combination, a recessed axle, wheels rotatably mounted on the axle, an elongated frame which is divided approximately above the axle into a tail and a bed, said bed being rigidly attached to the axle, said tail being hingeably attached to and supported by the axle, and said frame being selectively rearwardly tiltable as a linear entity by forwardly and upwardly revolving said axle about an axis passing through the wheel hubs, pulling and guiding means for said vehicle pivotably attached to said axle, means for releasably maintaining said frame against tilting, hinge means located a substantial distance forward of said axle pivotably connecting the axle to said tail and to the pulling and guiding means while permitting only upward pivoting of said tail and supporting the tail, in cooperation with the axle, as a cantilever beam when bed and tail comprise a horizontal entity, and locking means holding the upwardly pivoted tail at a selected angle to the bed.

5. A pulpwood pallet tilt trailer comprising, in combination, a recessed axle, a pair of ground-engaging wheels rotatably attached to the axle, pulling and guiding means pivotably attached to the axle at a substantial distance forward of said axle, an elongated frame comprising transversely-connected load-bearing longitudinal tracks separated into a bed and a tail, said bed being rigidly attached to said axle and releasably attached to the pulling and guiding means, and said tail being pivotably attached to the axle and to said pulling and guiding means a substantial distance forward of said axle while overriding and being supported by the axle as a cantilever beam, and stabilizing bars pivotably attached to the bed substantially near the front end of the bed, said frame as a co-extensive entity being selectively tiltable rearwardly into contact with the ground, said tail being selectively foldable upwardly into substantially vertical position, and said stabilizing bars being selectively pivotable upwardly into locking position with the folded tail.

(References on following page)

References Cited in the file of this patent

UNITED STATES PATENTS

| | | |
|---|---|---|
| 425,323 | Hornal | Apr. 8, 1890 |
| 753,323 | Sebring | Mar. 1, 1904 |
| 1,926,102 | Keller | Sept. 12, 1933 |
| 2,418,567 | Ausherman | Apr. 8, 1947 |
| 2,661,108 | Horn et al. | Dec. 1, 1953 |
| 2,924,374 | Scott | Feb. 9, 1960 |
| 2,925,186 | Anderson et al. | Feb. 16, 1960 |

FOREIGN PATENTS

| | | |
|---|---|---|
| 533,104 | Italy | Sept. 23, 1952 |

UNITED STATES PATENT OFFICE
CERTIFICATE OF CORRECTION

Patent No. 3,107,801            October 22, 1963

Joseph E. Blonsky

It is hereby certified that error appears in the above numbered patent requiring correction and that the said Letters Patent should read as corrected below.

Column 8, line 2, for "2,924,374" read -- 2,924,347 --.

Signed and sealed this 2nd day of June 1964.

(SEAL)
Attest:

ERNEST W. SWIDER
Attesting Officer

EDWARD J. BRENNER
Commissioner of Patents